United States Patent [19]
Smolka et al.

[11] Patent Number: 5,801,495
[45] Date of Patent: Sep. 1, 1998

[54] LOW-PRESSURE DISCHARGE LAMP CONTAINING PARTITIONS THEREIN

[75] Inventors: Ernst Smolka, Speyer; Franz Schilling, Maintal; Anke Schnabl, Hammersbach; Beate Herter, Stuttgart, all of Germany

[73] Assignee: Heraeus Noblelight GmbH, Hanau, Germany

[21] Appl. No.: 769,551

[22] Filed: Dec. 19, 1996

[30] Foreign Application Priority Data

Dec. 20, 1995 [DE] Germany .................. 195 47 813.4

[51] Int. Cl.$^6$ .................. H01J 61/30; H05B 37/00
[52] U.S. Cl. .................. 315/326; 315/246; 315/344; 313/609
[58] Field of Search .................. 315/246, 248, 315/267, 326, 338, 344; 313/610, 611, 112, 609, 634, 573

[56] References Cited

U.S. PATENT DOCUMENTS

| | | |
|---|---|---|
| 2,068,595 | 1/1937 | Burns . |
| 2,298,239 | 10/1942 | Stirnkorb . |
| 3,502,929 | 3/1970 | Richter et al. . |
| 4,816,719 | 3/1989 | Maya et al. .................. 313/610 |
| 4,884,007 | 11/1989 | Lagushenko et al. .................. 313/573 |
| 5,327,049 | 7/1994 | Smolka et al. . |

FOREIGN PATENT DOCUMENTS

| | | |
|---|---|---|
| 184217 | 6/1986 | European Pat. Off. . |
| 633760 | 8/1936 | Germany . |
| 911870 | 5/1954 | Germany . |
| 1 731 577 | 10/1955 | Germany . |
| 22 02 681 | 8/1972 | Germany . |
| 32 40 164 | 5/1984 | Germany . |
| 41 20 730 | 1/1993 | Germany . |
| 1003873 | 9/1965 | United Kingdom . |
| 2257562 | 1/1993 | United Kingdom . |

*Primary Examiner*—Robert J. Pascal
*Assistant Examiner*—David Vu
*Attorney, Agent, or Firm*—Frishauf, Holtz, Goodman, Langer & Chick, P.C.

[57] ABSTRACT

A low-pressure discharge lamp, in particular a deuterium lamp, includes a lamp envelope in which a plasma for generating UV radiation is formed by the capacitative generation of a high-frequency electromagnetic field. At least two partitions having openings are provided, wherein the openings are disposed on a common optical axis. The openings serve to constrict the plasma contained within the discharge vessel, which provides a high radial intensity of the plasma with high radiation stability for directing radiation along the optical axis. The radiation exits through a radiation emission window which is pervious to UV rays or through two exit windows placed opposite each other along the optical axis. The discharge lamp is particularly suitable for analytic measuring tasks, for example, as a light source in spectrophotometers.

25 Claims, 5 Drawing Sheets

5,801,495

LOW-PRESSURE DISCHARGE LAMP CONTAINING PARTITIONS THEREIN

BACKGROUND OF THE INVENTION

1. Field of the Invention

The present invention relates to a low-pressure discharge lamp in which a plasma is formed by a high-frequency electromagnetic field and in which the radiation generated by the plasma exits from a side of the discharge lamp which is pervious at least to UV rays. At least two partitions made of a material having a high temperature resistance, each having an opening for restricting the plasma, are disposed within the discharge lamp.

2. Background Information

U.S. Pat. No. 5,327,049 (the entire contents of which are hereby incorporated by reference) and DE-OS 41 20 730 disclose an electrodeless low-pressure discharge lamp wherein a plasma is formed in a bulb by a high-frequency electromagnetic field. The radiation generated by the plasma in U.S. Pat. No. 5,327,049 and DE-OS 41 20 730 exits the bulb. A diaphragm unit (cylindrical aperture member) made of a material with high temperature stability is disposed in the plasma range. The diaphragm unit contains an opening for confining the plasma. The diaphragm unit includes an optical axis through the opening along which the radiation exits. To obtain sufficiently high radiation flux and radial intensities when confining plasma in the high-frequency field, the materials must withstand high wall loads so that, at temperatures exceeding 15000° Kelvin, the materials will not disintegrate, melt, release impurities or even burst due to thermal shock when switching the lamps on and off.

U.S. Pat. No. 5,327,049 and DE-OS 41 20 730 disclose that boron nitride is the preferred material for the diaphragm unit.

In U.S. Pat. No. 5,327,049 and DE-OS 41 20 730, due to the bulb surrounding it, heat elimination from the area of the diaphragm unit in which the plasma is confined is problematic. With the increasing miniaturization of radiation sources, such discharge lamp is relatively costly with respect to its construction.

GB-PS 10 03 873 describes an electrodeless high-frequency discharge spectral lamp, which contains a concavely-closed bulb consisting of a translucent material. The bulb is separated into two sections, which are connected to each other by a capillary duct. Electromagnetic arrangements for exciting a discharge inside the metal vapor present in the bulb are provided. The generation of the electromagnetic energy for discharging purposes is provided by a coil arrangement surrounding the bulb, whereby the actual ignition takes place via external electrodes.

GB-PS 10 03 873 suffers from considerable ignition problems, which are troublesome, requiring additional electrodes to be provided in the outer area of the bulb to start the ignition. Radiation directed along a preferred radiation axis is not provided in this connection.

Furthermore, the size of the lamp of GB-PS 10 03 873 presents an obstacle, particularly with the small-scale constructions required by increasing miniaturization.

SUMMARY OF THE INVENTION

An object of the present invention is to provide an improved low-pressure discharge lamp.

A further object of the present invention is to provide a low-pressure gas discharge lamp with a continuous spectrum, in particular in the UV range.

A still further object of the present invention is to provide a discharge lamp with as high a radial intensity as possible, while maintaining high radiation stability, with the radiation being directed at a small solid angle.

An additional object of the present invention is to provide a simple, mechanical construction with small geometric dimensions, to be capable for use as a light source in spectrophotometers, in particular with liquid chromatographs (HPLC detectors), more particularly, in a spectral region of the $\lambda$ wavelength of 200 to 350 nm, with as high a radiation stability as possible.

The above objects, as well as other objects, aims and advantages are met by the present invention.

According to the present invention, a low pressure discharge lamp comprises: a lamp envelope having a first sealed end portion and a second sealed end portion, the lamp envelope having a gas fill sealed therein, the gas fill forming a plasma in response to an application of a high-frequency electromagnetic field. The lamp envelope includes (i) a side wall (which is preferably made from an opaque non-transparent material) defining an interior space and (ii) at least two partition members made of a high temperature-resistant material and which extend inwardly from the side wall, the at least two partition members disposed between the first sealed end portion and the second sealed end portion to divide the interior space into a plurality of subspaces. Each of the at least two partitions has an aperture therethrough. Each aperture has a cross-sectional size which is substantially smaller than a cross-sectional size of the lamp envelope at least at the first sealed end portion or the second sealed end portion, thereby constricting the plasma such that radiation generated by the plasma is emitted from the lamp envelope along an optical axis which coincides with an optical axis of each aperture. At least one radiation emission window is mounted on at least one of the first sealed end portion or the second sealed end portion for sealing the gas fill in the lamp envelope, the at least one radiation emission window being pervious to radiation generated by the plasma. An electrode is disposed at each of the first sealed end portion and the second sealed end portion. At least one electrode is disposed on the at least one radiation emission window, the at least one electrode having an opening which coincides with the optical axis of the lamp envelope and is in registration with the optical axis of each aperture.

BRIEF DESCRIPTION OF THE DRAWINGS

For the purposes of illustrating the invention there is shown in the drawings forms which are presently preferred. It is to be understood, however, that the present invention is not limited to the precise arrangements and instrumentalities depicted in the drawings.

DETAILED DESCRIPTION OF THE INVENTION

Figure 1:
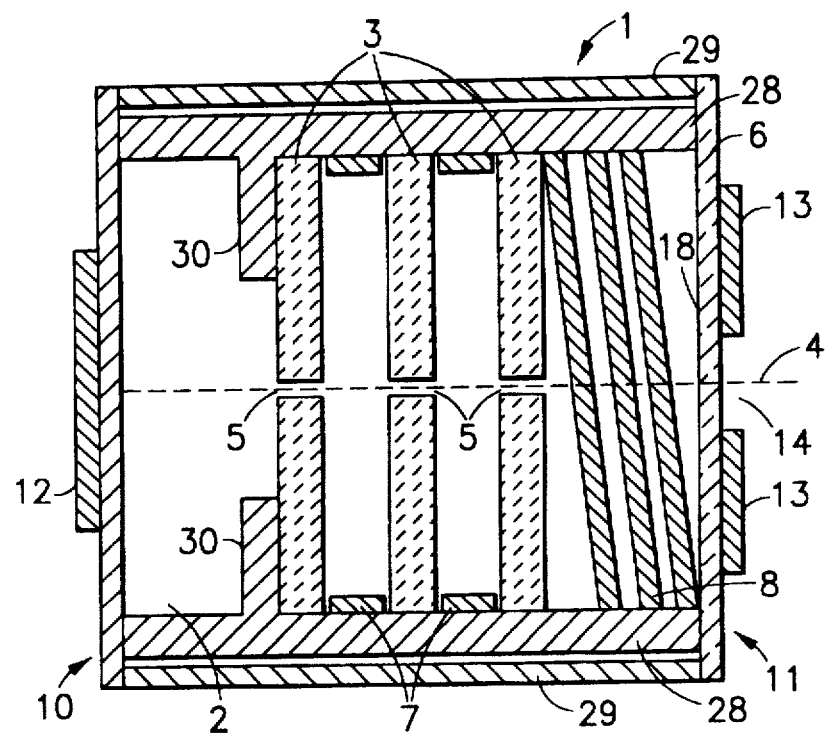
FIG. 1 is a longitudinal sectional view of a high-frequency excited low-pressure discharge lamp with three partitions, which includes a radiation exit with a narrow solid angle along the radiation exit axis, which provides a high radial intensity.

Referring to FIG. 1, the discharge lamp contains an axially symmetric lamp envelope (discharge vessel) 1 which is made of a high-temperature resistant material, which can be an electrically insulating material. The middle of the interior 2 of the lamp envelope 1 contains three partitions 3. Each partition 3 has an aperture 5 along an optical axis 4 (which causes a "pinched arc discharge") of the plasma contained therein.

The inner side wall 28 has a portion 30 which extends outwardly thereof and serves to hold a partition 3 in place. The partitions 3 are made of a high temperature-resistant material which can withstand temperatures up to about 1000° to up to about 3800° C. Such high temperature-resistance material can be an opaque ceramic material, such as boron nitride, aluminum nitride, aluminum oxide, thorium oxide, beryllium oxide, or polycrystalline diamond, or a refractory metallic material, such as molybdenum or tungsten.

The above high-temperature materials can withstand the following temperatures:

(a) aluminum oxide (high temperature stability up to 2050° C.), (b) aluminum nitride (high temperature stability up to 2500° C.; temperature of decomposition), (c) boron nitride (high temperature stability up to 2450° C.; temperature of decomposition), (d) thorium oxide (high temperature stability up to 3300° C.), (e) beryllium oxide (high temperature stability up to 2450° C.), (f) diamond (high temperature stability up to 3800° C.), (g) tungsten (high temperature stability up to 3380° C.) and (h) molybdenum (high temperature stability up to 2600° C.).

The outer side wall 29 can also be made of the same temperature-resistant materials as set forth in the preceding paragraph.

By use of the above materials, a high radiation flux and radial intensities can be obtained at a small solid angle; the plane angle of the radiation having a half-width value ranging from about 0.05 to about 0.1 rad. It is, of course, possible to change the radiation angle in a broad range by varying the geometries of the partitions 3, the number of partitions 3, the distance between partitions 3 and the size of the exit openings 14 and 21 (shown in FIG. 4), respectively.

A radiation emission window 6 is disposed on at least at one of the sealed end portions 10,11 of the lamp envelope 1 in the path of the optical axis 4. The radiation emission window 6 is pervious at least to UV radiation. The radiation emission window 6 is made of, for example, a glass such as silica glass, a UV pervious glass or from sapphire.

The joining (bonding) of the lamp envelope 1 and the radiation emission window 6 can take place by melting on the edge of the radiation emission window 6 or through a molten glass frit connection between the lamp envelope 1 and the radiation emission window 6.

The lamp envelope 1 is hermetically sealed at each sealed end portions 10,11, one or both of which sealed end comprises the radiation emission window 6. FIG. 1 shows a radiation emission window 6 at each sealed end portions 10,11.

To ensure a defined position of the partitions 3 with respect to each other and to the sealed end portions 10,11 of the lamp envelope 1 and the optical axis 4, respectively, a corresponding holder, for example, spacer rings 7, are provided, while taking into account the various properties of the individual materials and the gas discharge. To make allowance for the thermal expansion of the individual components, preferably hollow-cylinder, screw-type springs 8 or leaf springs made of a ceramic material, silica glass and/or a metal can be used. Alternatively, adjusting the thermal expansion coefficient of the materials to be used is an option.

The partitions 3 can account for a large portion of the space (volume) of the interior 2 (taking into account thermal expansion) The partitions 3 each contain an aperture 5 with a diameter of about 0.01 to about 6 mm, in particular of about 0.3 to about 6 mm. Each aperture can comprise a channel with a thickness (length) of about 0.001 to about 100 mm, and in particular of about 0.01 to about 50 mm. If the diameter of the aperture is about 0.3 to about 6 mm, the length of the channel is preferably about 0.001 to about 20 mm. Subsequent to manufacture-specific cleaning procedures (annealing, etching, etc.) which are generally known to one of ordinary skilled in the art, the lamp envelope 1 is preferably filled with deuterium at a cold inflation pressure of about 1 to about 100 mbar.

On the sealed end portions 10,11 of the lamp envelope 1, planar electrodes 12,13 made of electrically conductive material are respectively attached opposite each other, along the path of the optical axis 4. Electrode 13, which is located on the sealed end portion 11 (radiation exit side), is provided with a radiation exit opening 14 for the radiation to exit along optical axis 4. Gold-plated copper is a preferable material for the electrodes 12,13. However, it is also possible, using the standard thick-film technique, to apply and burn in electrically-conductive pastes onto the sealed end portions 10,11, while taking into account the space required for the radiation exit opening 14.

Figure 2:
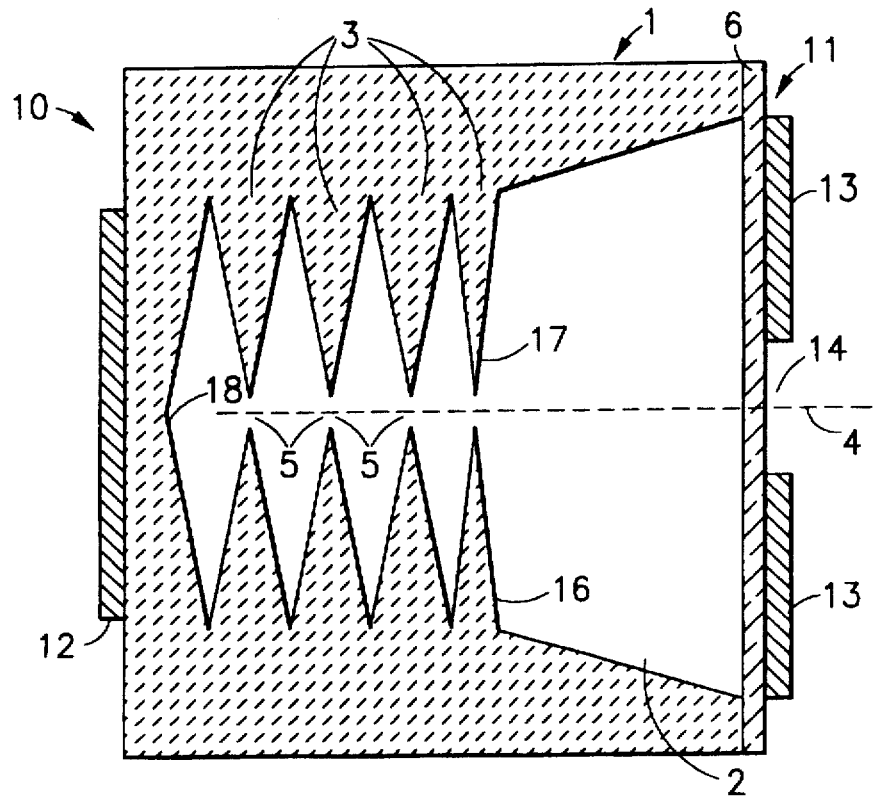
FIG. 2 is a longitudinal sectional view of a discharge lamp according to the present invention with a sealed end portion, side wall and partitions being a monolithic arrangement.

As shown in FIG. 2, the lamp envelope 1 and the partitions 3 can be made of the same material and can be made as a one piece integral unit. In this embodiment, the radiation emission window 6 is attached to the lamp envelope 1 as described herein.

FIG. 2 shows a variation of the embodiment depicted in FIG. 1, in which the lamp envelope 1 containing a sealed end portion and the partition unit 3 (containing four partitions in the shape of opposing teeth) are manufactured from a monolithic material, preferably a ceramic material. The interior 2 in the area of the sealed end portion 11 is closed by radiation emission window 6 which serves as a cover to form a hermetic seal. The radiation emission window 6 is made of a transparent material, preferably silica glass. Along optical axis 4, two oppositely placed electrodes 12, 13 are attached onto the sealed end portions 10, 11, respectively. Electrode 13 has a radiation exit opening 14.

Figure 3A:
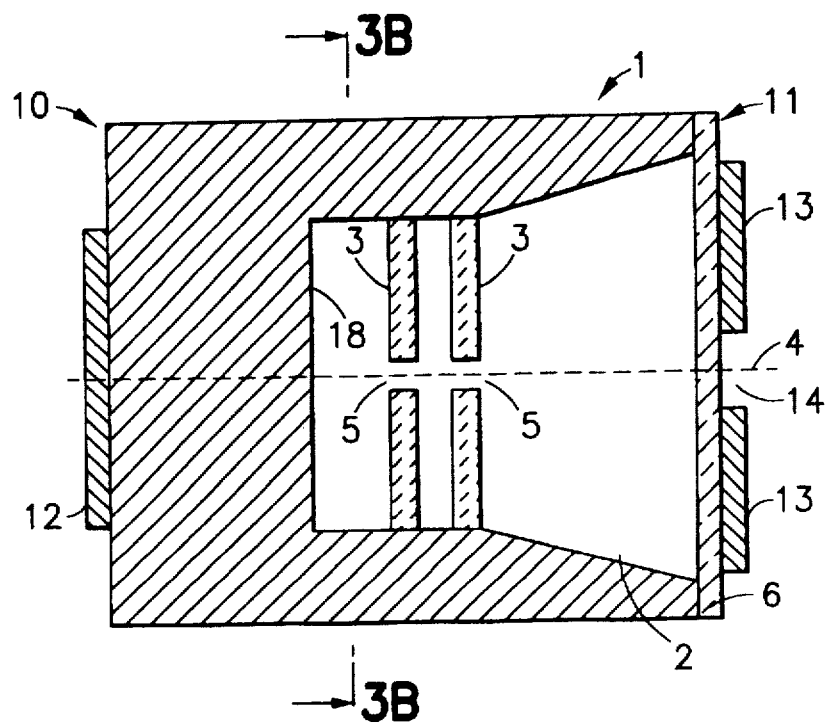
FIG. 3A is a longitudinal sectional view depicting an embodiment of the present invention having two partitions and wherein an end portion and the side wall is an integral unit.
Figure 3B:
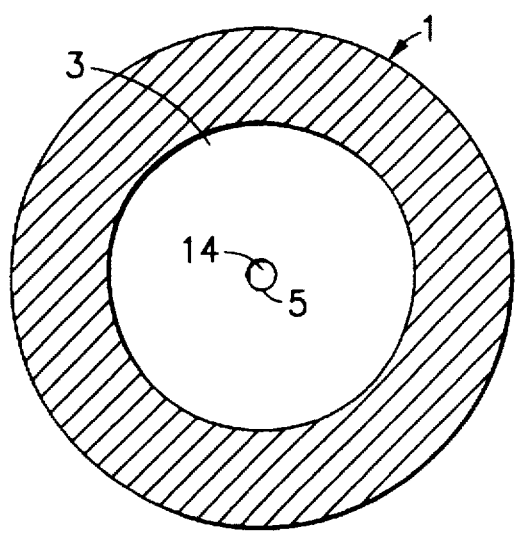
FIG. 3B is a sectional view taken along line 3B—3B in FIG. 3A.

The exterior diameter of the largely cylindrically shaped system (electrodes, lamp envelope, partitions) ranges from about 5 to about 80 mm. However, it is also possible to provide further miniaturization by utilizing the field of microstructures. Additionally, the partition geometry can be varied. Furthermore, a reflector surface 17 can be formed by deforming the partition front side 16 (the side facing the radiation emission window 6) or by the attachment of a second ceramic material. Such reflector surface 17 can reflect radiation of the UV spectral region and makes it possible to achieve an increase of the radiation flux. The rearward section 18 of the lamp envelope 1, as well as the partition front side 16, or the second ceramic material as the reflector surface 17, can be metallized and serve as a reflector, for example, by lining or coating with a reflecting ceramic material, a metal or a metallic coating. Light radiated rearwardly can, however, also be reflected by a metallization on one of the electrodes FIGS. 3A and 3B show an embodiment for the use of refractory ceramic or metallic partitions 3, respectively, in the lamp envelope 1. The lamp envelope 1 and the partitions 3, respectively, can be made of one material, or different materials. In applications with radiation arrangements of high radial intensity, ceramic materials, silica and refractory metals are particularly suitable. Thus, the partitions 3 can be enclosed by the lamp envelope 1 made of a ceramic, for example, serving as a holder for the partitions 3, whereas the partitions 3 can be made of another material, such as a refractory metal.

It is possible, aside from deuterium, to also use other charge gases. In that case, a more intense emission of the confined plasma is observed. Basically, inert gases, as well as hydrogen, metal vapors (for example, mercury vapor) and reactive gases, as well as combinations thereof, can be used as the change gas or gas fill.

Figure 4:
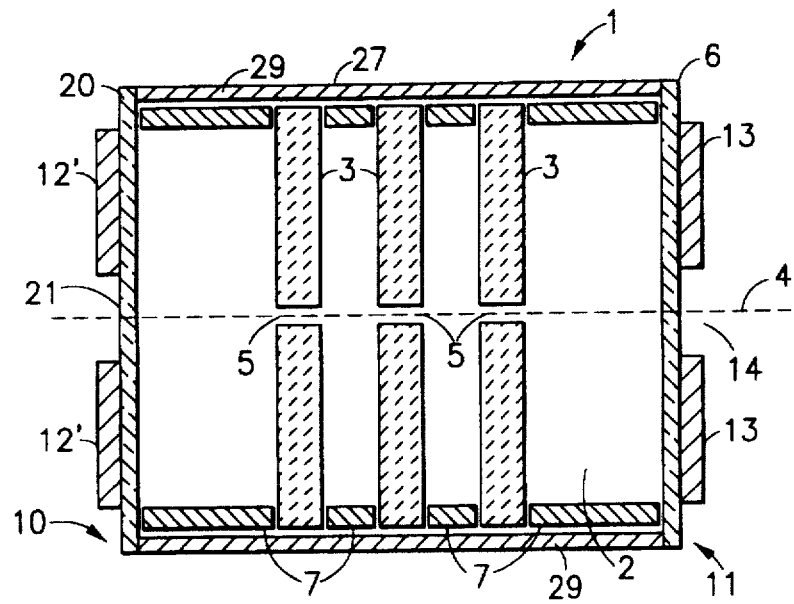
FIG. 4 is a longitudinal sectional view of a discharge lamp according to the present invention with three partitions spaced apart by partition holders (spacers) and having a radiation emission window at each sealed end portion thereof.

FIG. 4 shows a discharge lamp 1 modified with respect to FIG. 1, with two radiation emission windows 6 and 20 which are placed opposite each other on sealed end portions 11 and 10, respectively. In FIG. 4, the electrode 12' has a construction similar to that of the electrode 13. That is, the electrode 12' is mounted on the radiation emission window 20 and is disposed along the optical axis 4 with an opening 21 for the radiation to exit or pass, respectively. Based on the lamp geometry extending along the optical axis 4, the lamp can be used in an optimal fashion as a transradiation lamp.

With respect to FIG. 4, the light radiated rearwardly or through radiation emission window 20, respectively, can also be detected by a fast photodiode and be used in a loop to increase the stability of the lamp.

Figure 5:
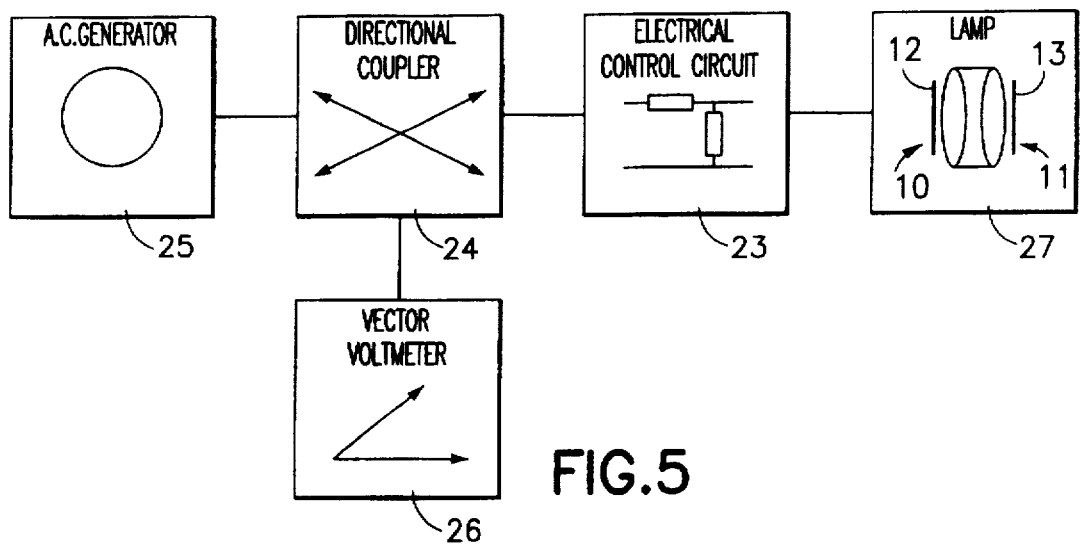
FIG. 5 is a schematic drawing of an electrical circuit arrangement to control a capacitatively excited lamp.

In FIG. 5, the circuit arrangement represented in block diagram format is provided for electrical control. The schematically represented lamp 27 includes at each of its sealed end portions 10,11, an electrode 12, 13, respectively, which can be capacitatively excited via an electrical control circuit 23 and a directional coupler 24 by an A.C. generator 25. The A.C. generator 25 provides outputs in the range of about 10 to about 100 watts, whereby the upper frequency limit is at approximately 100 gigahertz and the lower frequency is at about 500 Hz; in particular, at an upper frequency limit of about 2.45 gigahertz and a lower frequency limit at approximately 10 KHz. The directional coupler 24 serves solely for uncoupling a measuring signal for optimizing the control network 23 with the aid of a vector voltmeter 26.

The frequency range of the A.C. generator 25 for high-frequency excited discharge lamps ranges from several KHz (to avoid extinguishing the discharge) up to several GHz. Generator costs increase with the frequency, so that the current upper frequency limit is at approximately 2.45 GHz. Generators with even higher frequencies are either too expensive or are not available for delivery of outputs ranging from about 10 to about 100 watts with efficiency factors sufficient in the field. By increasing the excitation frequencies, there is an improvement in the lamp efficiency, moreover, the matching connection for the discharge lamp is simplified since stubs can be used.

Furthermore, when increasing the frequency to more suitable values, the reactance of the lamp changes. The low capacity of the silica walls results in small frequencies in a high reactance, which can be matched only with very high inductivities. In practice, operation takes place in the frequency range of about 0.01 to about 2450 MHz, thus, basically, any frequencies in this range can be used. In this case, a frequency of about 13 MHz has proven particularly suitable. The matching takes place according to generally known transformation circuits.

Figure 6:
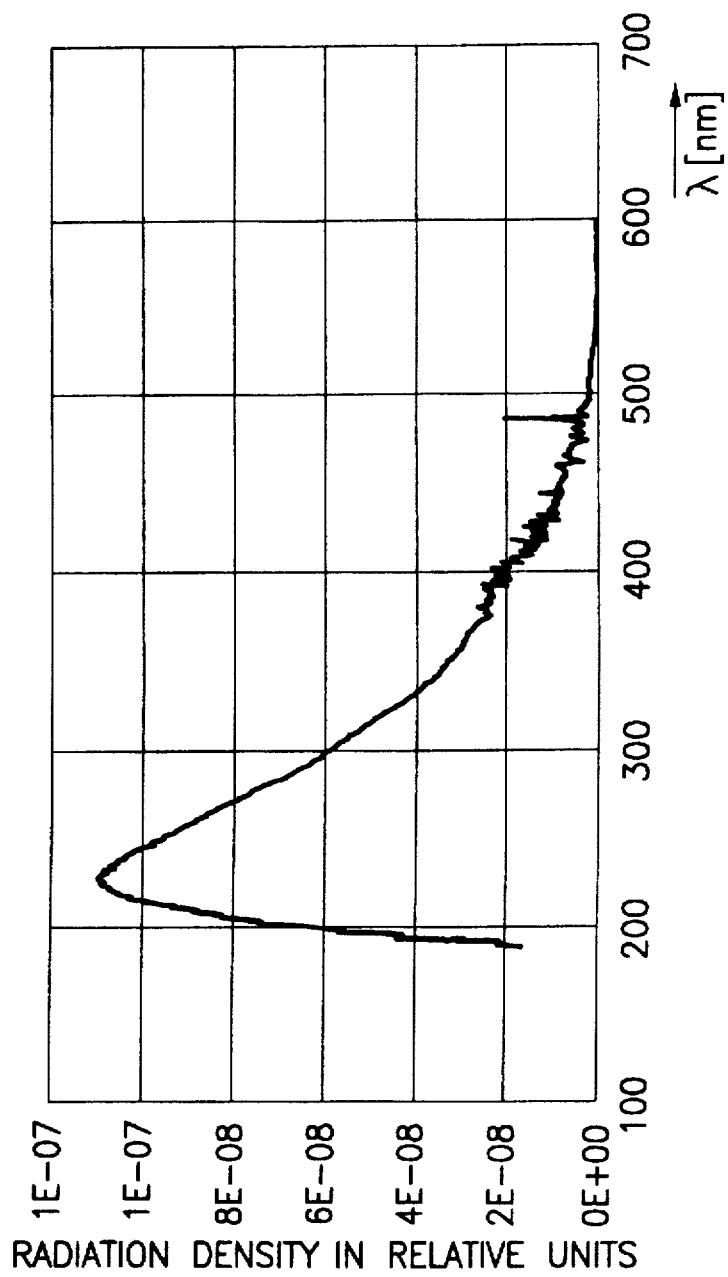
FIG. 6 is a graph which shows the spectrum of the radiation emitted from a discharge lamp according to the present invention.

The spectrum represented in FIG. 6 of a discharge lamp with a deuterium charge according to the present invention includes a continuum ranging from about 200 to about 350 nm which, due to its high radiation stability, is particularly suitable for analytical measurements.

Figure 7:
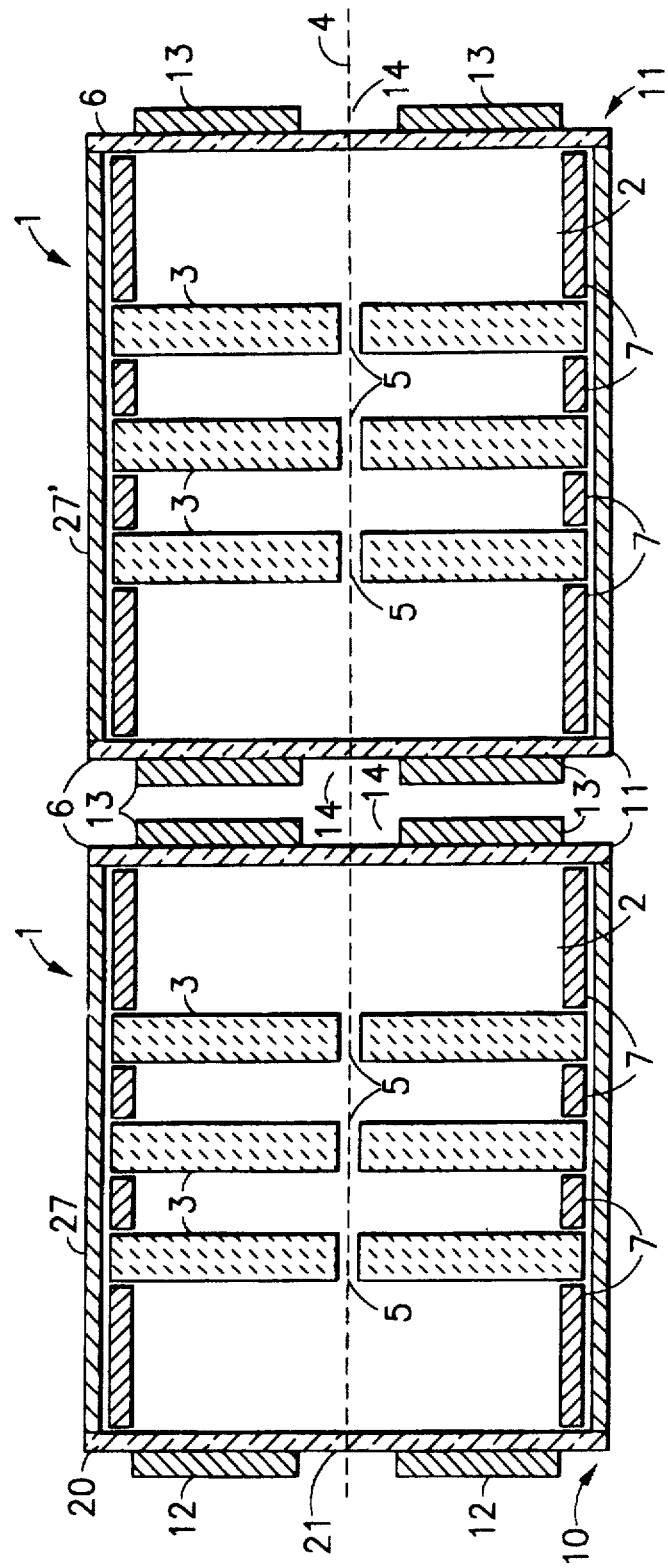
FIG. 7 is a longitudinal sectional view of two discharge lamps, as shown in FIG. 4, in series.

As shown in FIG. 7, a second discharge lamp 27 with another spectrum can be disposed on the same optical axis 4 of the first discharge lamp 1 in such a manner that its radiation is also directed through the openings 5 and that, without exchanging the lamps, an extended useful spectral region is obtained. The second lamp 27' can be constructed as an external exchangeable unit, but it can also be directly optically coupled to the first lamp and together form a double lamp unit. Thus, one discharge chamber can receive a charge of deuterium and the other a charge containing xenon, whereby the spectra then are superimposed.

The present invention is particularly advantageous by providing a large spectral bandwidth in the continuum of the emitted radiation, without impairing the lamp atmosphere, because electrodes do not intrude into the plasma in the lamp. This also results in an increase of the service life. An additional advantage of the present invention resides in the directed radiation, while maintaining high radial intensity at a small angle.

Furthermore, the simple geometric construction of the present invention enables a diminutive construction size, so that, if required, attachment of the radiation source onto a printed circuit board is possible.

A particularly advantageous feature of the present invention is the providing of a discharge lamp with radiation exit windows which are placed opposite each other along the optical axis, since the radiation directed along the optical axis can be supplemented in its spectrum with the aid of additional series-arranged radiation sources. In this manner, it is possible, for example, to superimpose additional spectral components of the visible and/or infrared spectrum of the UV radiation generated by the discharge lamp of the present invention.

It will be appreciated that the instant specification is set forth by way of illustration and not limitation, and that various modifications and changes may be made without departing from the spirit and scope of the present invention.

What is claimed is:

1. A low-pressure discharge lamp comprising:
   a lamp envelope having a first sealed end portion and a second sealed end portion, said lamp envelope having a gas fill sealed therein, said gas fill forming a plasma in response to an application of a high-frequency electromagnetic field, said lamp envelope including: (i) a side wall defining an interior space and (ii) at least two partition members made of a high temperature-resistant material and extending inwardly from said side wall, said at least two partition members disposed between said first sealed end portion and said second sealed end portion to divide said interior space into a plurality of subspaces, each of said at least two partitions having an aperture therethrough, said aperture having a cross-sectional size which is substantially smaller than a cross-sectional size of said lamp envelope at least at said first sealed end portion or said second sealed end portion, thereby constricting the plasma such that radiation generated by the plasma is emitted from said lamp envelope along an optical axis which coincides with an optical axis of each of said apertures, at least one radiation emission window mounted on at least one of said first sealed end portion and said second sealed end portion for sealing said gas fill in said lamp envelope, said at least one radiation emission window being pervious to radiation generated by the plasma, and an electrode disposed at each of said first sealed end portion and said second sealed end portion, at least one of electrodes being disposed on said at least one radiation emission window, said at least one of said electrodes having an opening which coincides with said optical axis of said lamp envelope and is in registration with said optical axis of each aperture.

2. The discharge lamp according to claim 1, wherein said side wall is made of an opaque material which can withstand temperatures of up to about 1000° C. to up to about 3800° C.

3. The discharge lamp according to claim 2, wherein said at least two partition members are made of a material which can withstand temperatures of up to about 1000° C. to about 3800° C.

4. The discharge lamp according to claim 1, wherein there are at least three partitions members.

5. The discharge lamp according to claim 1, wherein said at least two partition members and the side wall are provided in a monolithic unit.

6. The discharge lamp according to claim 5, wherein four partitions terminate in opposing teeth.

7. The discharge lamp according to claim 1, wherein said at least one radiation emission window is pervious to UV rays.

8. The discharge lamp according to claim 1, wherein said side wall and one of said first sealed end portion and said second sealed end portion comprise a one piece integral unit.

9. The discharge lamp according to claim 1, said aperture has a diameter of about 0.01 to about 6 mm.

10. The discharge lamp according to claim 1, wherein said aperture has a diameter of about 0.3 to about 6 mm.

11. The discharge lamp according to claim 1, wherein said aperture comprises a linear channel.

12. The discharge lamp according to claim 11, wherein said linear channel has a length of about 0.001 to about 100 mm.

13. The discharge lamp according to claim 11, wherein said linear channel has a length of about 0.01 to about 5 mm.

14. The discharge lamp according to claim 1, wherein the another of the at least one of said first sealed end portion and said second sealed end portion has on an inside surface thereof, a surface for reflecting generated radiation.

15. The discharge lamp according to claim 1, wherein both of said first sealed end portion and said second sealed end portion includes a radiation emission window, and each of said electrodes is disposed on said radiation emission windows, both of said electrodes having an opening which coincides with said optical axis of said lamp envelope and is in registration with said optical axis of each aperture.

16. The discharge lamp according to claim 15, wherein spacer members separate three partitions from each other.

17. The discharge lamp according to claim 1, wherein said at least two partition members are made of a material selected from the group consisting of aluminum oxide, aluminum nitride, and boron nitride.

18. The discharge lamp according to claim 1, wherein said at least two partition members are made of a material selected from the group consisting of thorium oxide, beryllium oxide, polycrystalline diamond, molybdenum and tungsten.

19. The discharge lamp according to claim 1, wherein said side wall is made of a material selected from the group consisting of aluminum oxide, aluminum nitride, boron nitride, thorium oxide, beryllium oxide, polycrystalline diamond, molybdenum and tungsten.

20. The discharge lamp according to claim 1, which further comprises an electrically insulating component which is disposed between the at least two partition members.

21. The discharge lamp according to claim 1, wherein said gas fill comprises deuterium with a cold inflation pressure of about 1 to about 100 mbar.

22. The discharge lamp according to claim 1, wherein said electrodes are connected to a high-frequency generator which generates an excitation frequency of about 500 Hz to about 100 GHz.

23. The discharge lamp according to claim 1, wherein said radiation emission window is made of a material selected from the group consisting of silica glass and sapphire.

24. The discharge lamp according to claim 1, wherein both of said first sealed end portion and said second sealed end portion includes a radiation emission window, each of said electrodes is disposed on said radiation emission windows, one of said electrodes having an opening which coincides with said optical axis of said lamp envelope and is in registration with said optical axis of each aperture, said discharge lamp having three partitions, one of said partitions being retained by a spring member, another of said partitions being retained on each side thereof by a spacer member and another of said partitions being retained at one side thereof by a spacer member and at another side thereof by a holder member which extends perpendicularly inward from said side wall and is formed integrally with said side wall.

25. A discharge lamp unit comprising:

a first low-pressure discharge lamp according to claim 1, and a second low-pressure discharge lamp according to claim 1 and having a radiation axis which coincides with the optical axis of the first low-pressure discharge lamp.

* * * * *